United States Patent [19]

Koike

[11] 4,387,418

[45] Jun. 7, 1983

[54] SWITCHING REGULATOR

[75] Inventor: Tsutomu Koike, Matsuyama, Japan

[73] Assignee: Toko, Inc., Higashi-Yukigaya, Japan

[21] Appl. No.: 206,970

[22] Filed: Nov. 14, 1980

Related U.S. Application Data

[62] Division of Ser. No. 928,441, Jul. 27, 1978, Pat. No. 4,283,759.

[30] Foreign Application Priority Data

| Aug. 1, 1977 | [JP] | Japan | 52/91425 |
| Sep. 29, 1977 | [JP] | Japan | 52/117210 |
| Feb. 24, 1978 | [JP] | Japan | 53/20480 |
| Mar. 2, 1978 | [JP] | Japan | 53/23991 |
| Apr. 26, 1978 | [JP] | Japan | 53/49453 |

[51] Int. Cl.³ .................................... H02M 3/335
[52] U.S. Cl. .................................... 363/19; 363/97
[58] Field of Search ................ 323/285–287; 361/18; 363/18–21, 97, 124, 131

[56] References Cited

U.S. PATENT DOCUMENTS

| 3,072,837 | 1/1963 | Hakimoglu | 323/263 |
| 3,701,937 | 10/1972 | Combs | 363/25 |
| 3,818,318 | 6/1974 | Schott et al. | 323/287 |
| 3,909,696 | 9/1975 | Katou et al. | 363/21 |
| 3,931,566 | 1/1976 | Pask et al. | 323/285 |
| 3,986,101 | 10/1976 | Koetsch et al. | 323/281 |
| 3,989,995 | 11/1976 | Peterson | 363/19 |
| 4,146,832 | 3/1979 | McConnell | 323/285 |
| 4,150,424 | 4/1979 | Nuechterlein | 363/97 |

FOREIGN PATENT DOCUMENTS 2226089 12/1973 Fed. Rep. of Germany ........ 363/97

Primary Examiner—A. D. Pellinen
Attorney, Agent, or Firm—Schwartz, Jeffery, Schwaab, Mack, Blumenthal & Koch

[57] ABSTRACT

A switching regulator is disclosed which is designed so that a negative feedback is applied to the base of a transistor constituting an oscillator adapted for chopping a DC voltage, only during a period of time which is required to effect pulse width control when the transistor is switched from conduction to non-conduction. A control circuit may also be provided which is arranged to compare the output of a current detecting circuit for detecting a current proportional to a current for driving a transformer with the output of an error voltage amplifier for amplifying an output resulting from comparison of a rectified version of the AC output of the transformer with a reference voltage. The foregoing control circuit is also arranged so that when the output of the current detecting circuit exceeds the output of the error amplifier, a trigger signal is imparted to cause the oscillator to be changed from the on state to the off state.

4 Claims, 15 Drawing Figures

(a)

(b)

F I G. 7
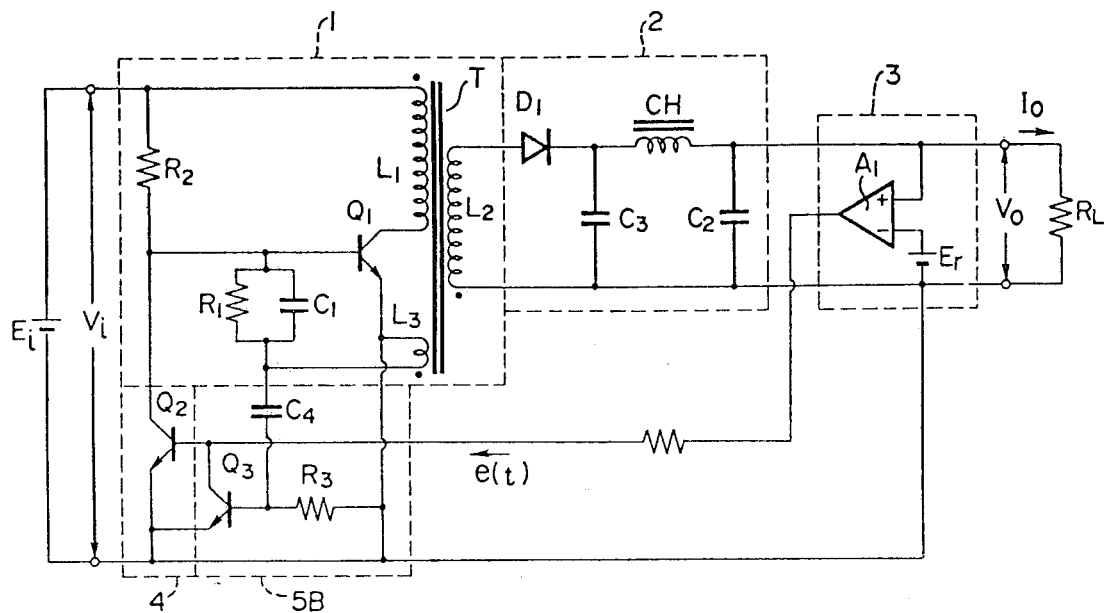
F I G. 8
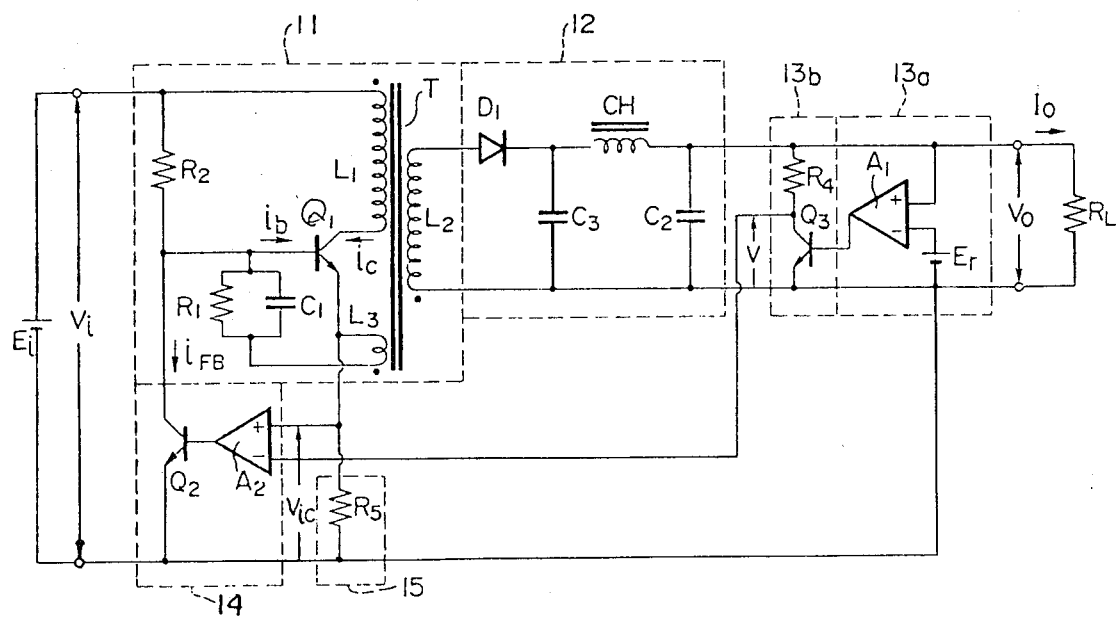

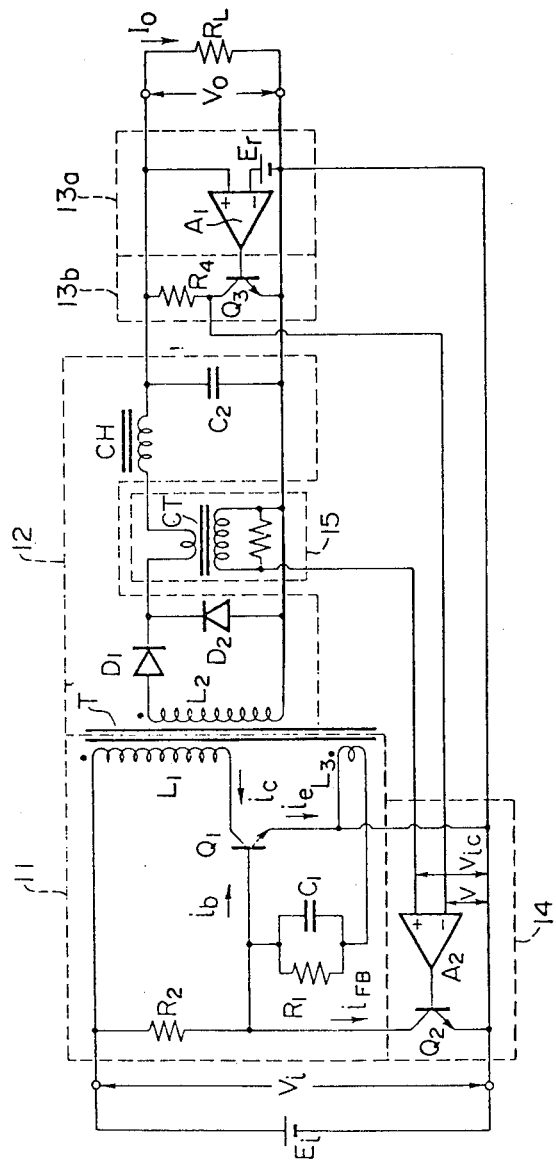
F I G. 10

SWITCHING REGULATOR

This is a division of application Ser. No. 928,441, filed July 27, 1978 now U.S. Pat. No. 4,283,759.

This invention relates to a so-called switching regulator which utilizes pulse width modulation to provide a stabilized output voltage and has a high power conversion efficiency as well as a high operating reliability, and more particularly it pertains to such a regulator including means for preventing a relaxation oscillator included therein from being brought into an intermittent oscillation state due to hunting phenomena tending to occur in the negative feedback control system, thereby ensuring that continuous oscillation is maintained.

Among regulated DC power supply devices are dropper-type ones and switching type ones. The dropper type power supply devices are advantageous in that the output voltage thereof can be reliably controlled by virtue of the fact that there is no element of time delay in the negative feedback control system because no smoothing circuit or the like is incorporated therein, but disadvantageous in that high power loss occurs in the series control transistors thereof. In contrast thereto, the switching type power supply devices, which will be referred to as switching regulators, is advantageous in that the switching loss in the oscillator transistor is low, but disadvantageous in that an element or elements of time delay are inevitably introduced in the negative feedback control system due to the fact that a smoothing circuit or the like is included therein. Thus, the switching regulators are liable to be subjected to hunting phenomena, as a result of which the control of the output voltage becomes unreliable. Another problem with the switching regulators is such that departure from the region for safe operation of the oscillator transistors is liable to occur due to the fact that the oscillator transistor constitutes an inductance load.

It is an object of this invention to provide a switching regulator which is capable of maintaining the function of stabilizing the output voltage even if hunting phenomena occur in the negative feedback control system, and utilizes pulse width modulation to thereby further stabilize the output voltage.

Another object of this invention is to provide a switching regulator which is so designed that the collector loss of the oscillator transistor can be reduced by improving the driving characteristics of such transistor, whereby the power conversion efficiency as well as the operating reliability thereof is enhanced and adverse influence by dispersion of the transistor characteristics is avoided.

Briefly stated, according to this invention, there is provided a switching regulator comprising an oscillator circuit for chopping a DC voltage supplied from an input power source, thereby driving a transformer; a rectifier circuit for rectifying an AC output available from the transformer; a feedback circuit for comparing the thus rectified output voltage with a reference voltage and providing negative feedback to the base of the oscillator transistor in accordance with the deviation value detected through the foregoing comparison; and means for permitting a negative feedback signal to be applied only during that period of the relaxation oscillation periods which is required to effect pulse width control and in which the oscillator transistor is switched from on to off.

Other objects, features and advantages of the present invention will become apparent from the following description taken in conjunction with the accompanying drawings.

FIG. 7 is a circuit diagram showing a modification to the circuit of FIG. 5.

FIG. 8 is a circuit diagram showing the switching regulator according to another embodiment of this invention.

FIG. 10 is a circuit diagram showing still another embodiment of this invention.

Figure 1:
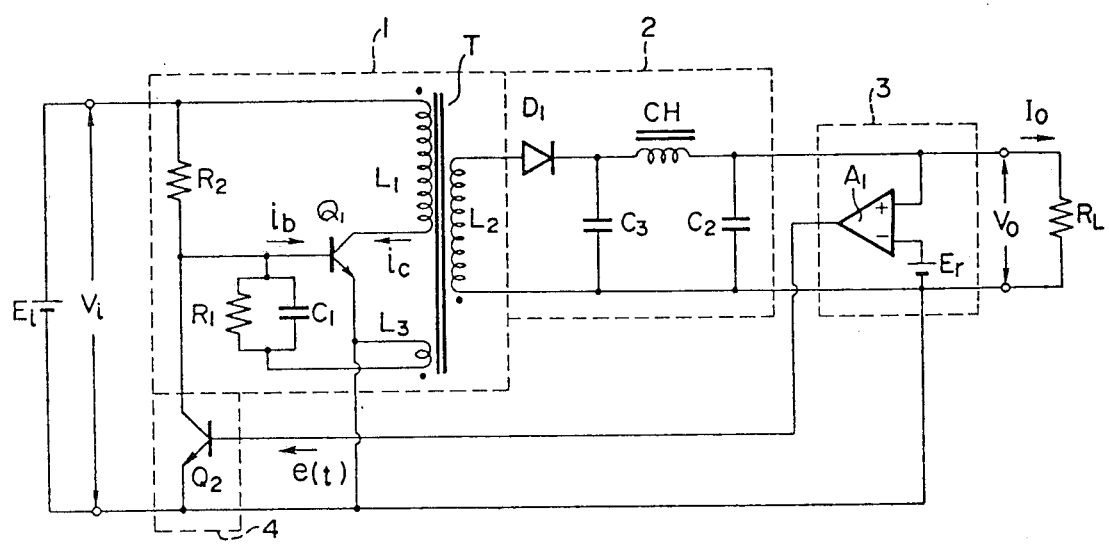
FIG. 1 is a circuit diagram showing an example of the conventional switching regulators.

Referring to FIG. 1, there is shown the aforementioned conventional switching regulator, the disadvantages of which will now be described in order to give a better understanding of the present invention.

FIG. 1 shows an example of blocking oscillation type switching regulator which is designed so that the output voltage can be stably controlled. The circuit arrangement shown therein is well known in the art, and therefore, detailed description thereof will be omitted. In such a prior-art switching regulator, stabilized output voltage control has been effected by means such as commonly called ringing choke system. More specifically, in FIG. 1, when a transistor $Q_1$ is rendered conductive, an excitation current $V_i/L_1 \cdot t$ (where $V_1$ is an input power source voltage, t is the conduction time of the transistor $Q_1$, and $L_1$ is the inductance of the primary winding of a transformer T) is caused to flow through the primary winding $L_1$ of the transformer T so that excitation energy is stored in the transformer T. In this case, the primary winding $L_1$ and secondary winding $L_2$ of the transformer are connected in such a manner that a reverse bias is imparted to a diode $D_1$ provided in an output rectifying circuit 2. When the transistor $Q_1$ is rendered non-conductive, the aforementioned excitation energy is taken out at the output rectifying circuit 2 as an output voltage which is given as follows:

$$V_o = \sqrt{\frac{R_L}{2L_1}} \cdot \frac{t_{ON}}{\sqrt{t_{ON} + t_{OFF}}} \cdot V_i \quad (1)$$

where $R_L$ is a load resistance, $t_{ON}$ is the conduction time of the transistor $Q_1$, $t_{OFF}$ is the non-conduction time of the transistor $Q_1$. It is assumed that there is no forward voltage drop in the diode $D_1$. Thus, by controlling the conduction time $t_{ON}$ in the above equation (1), it is possible to stabilize the output voltage $V_0$.

Figure 2:
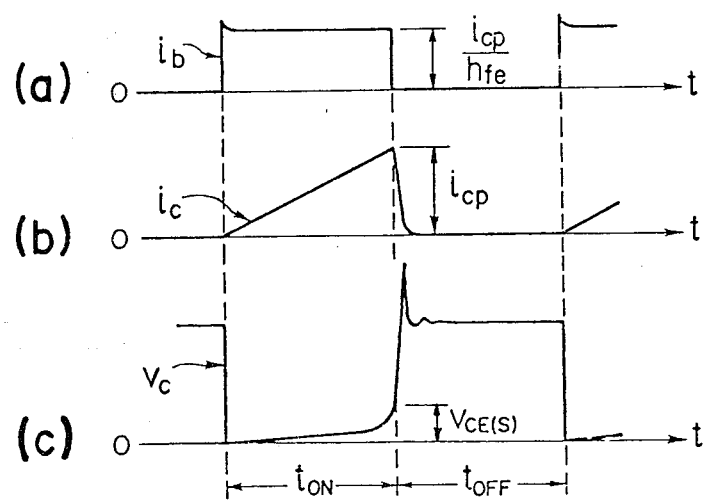
FIG. 2 is a view showing the operating current and voltage waveforms of the oscillator transistor $Q_1$ shown in FIG. 1.

Referring to FIG. 2, there are shown operating voltage and current waveforms which occur in a blocking oscillator circuit 1 of the type wherein oscillation is produced through utilization of collector current saturation of a transistor as shown in FIG. 1, i.e., the relations among the base current $i_b$, collector current $i_c$ and collector voltage $V_c$ of the oscillator transistor $Q_1$. The collector current peak value $i_{cp}$ of the transistor $Q_1$ is given by $$i_{cp} = h_{fe} \cdot i_b$$

where $h_{fe}$ is the current amplification factor. The conduction time $t_{ON}$ of the transistor $Q_1$ is given by $$t_{ON} = \frac{L_1}{V_i} \cdot h_{fe} \cdot i_b \quad (2)$$

As is apparent from the above equation (2), the conduction time $t_{ON}$ of the transistor $Q_1$ can be controlled by controlling the base current $i_b$.

Thus, by driving a transistor $Q_2$ by a control signal derived from a voltage comparator circuit 3, and by shunting the base current $i_b$ imparted to the transistor $Q_1$, in accordance with the controlled variable, the conduction time $t_{ON}$ of the transistor $Q_1$ is controlled. The blocking oscillation system of the aforementioned type has such an advantage that the saturation point for the collector current $i_c$ of the transistor $Q_1$ can be freely changed by controlling the base current $i_b$ thereof, whereby pulse width control is facilitated. Disadvantageously, however, the transistor $Q_1$ is only provided with the minimum of the base current, $i_b = i_{cp}/h_{fe}$, which is required for saturation of the collector current $i_c$ of the transistor $Q_1$, so that the collector saturation voltage $V_{CE(S)}$ is inevitably increased as can be seen from FIG. 2. Moreover, reversing trigger for turning off the transistor $Q_1$ is proportional to the derivative $di_c/dt$ of the collector current $i_c$; thus, in the case where use is made of a switching transistor with a gentle collector current saturation point in the $V_c$-$I_c$ characteristic thereof, the reversing trigger, or $Mdi_c/dt$ is small, where M represents the mutual inductance between the primary winding $L_1$ and the feedback winding $L_3$ of the transformer T, and in addition, the reversal speed is also slow so that switching loss is increased and the collector saturation voltage is also increased. Consequently, the power conversion efficiency of the switching regulator is decreased, and the operational reliability is also degraded. At the moment that the transistor $Q_1$ with an inductance component in its load is switched from conduction to non-conduction, a maximum collector current is caused to flow therethrough; thus, the transistor saturation type blocking oscillator circuit 1 is disadvantageous in that switching loss is inevitably increased.

Figure 3:
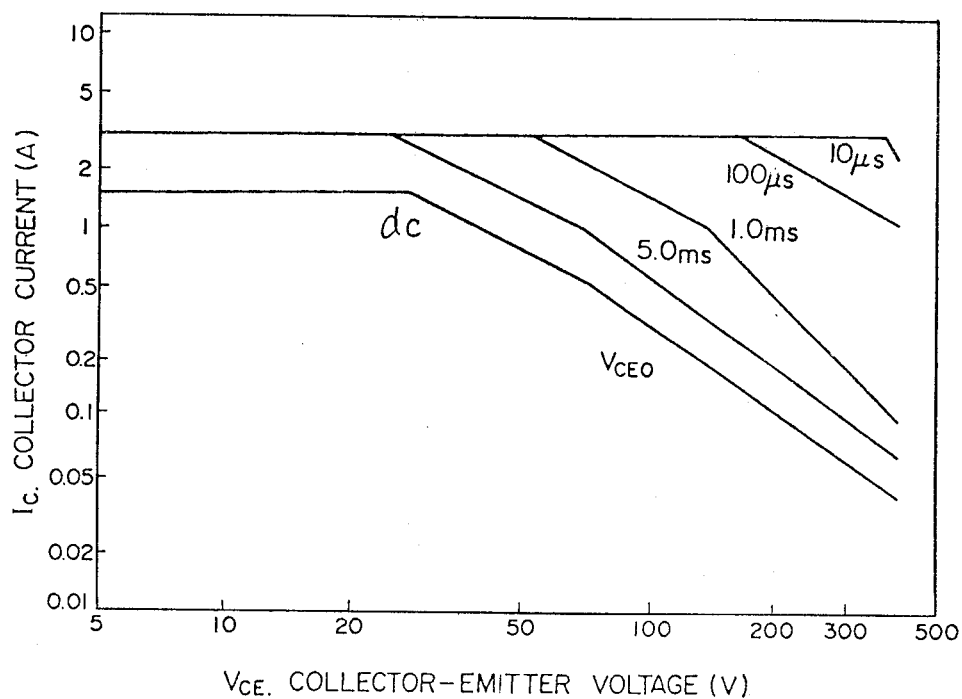
FIG. 3 is a view illustrating the region for safe operation of the transistor.
Figure 3:
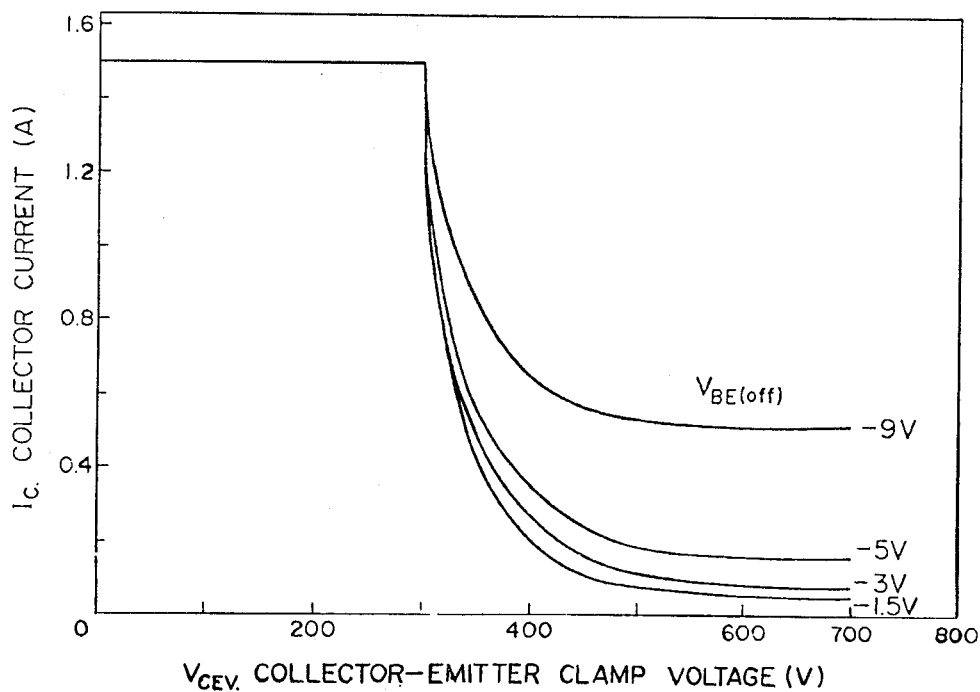

Referring to FIG. 3, the region for safe operation when the transistor is provided with a forward base bias is shown at (a), and the region for safe operation when the transistor is provided with a reverse base bias is shown at (b). As is also apparent from FIG. 3 (a) and (b), it is known that the greater the reverse base bias, the wider becomes the region for safe operation, when a switching transistor is switched from conduction to non-conduction.

More specifically, at the moment that the transistor $Q_1$ with inductance component in its load is switched from conduction to non-conduction, the base of the transistor $Q_1$ also tends to be reversely biased by a feedback winding $L_3$, resistor $R_1$, capacitor $C_1$ and so forth, but since the reverse bias voltage is proportional to the collector voltage $V_c$ of the transistor $Q_1$, the reverse bias becomes deeper and deeper as the collector voltage $V_c$ of the transistor $Q_1$ builds up. Furthermore, the transistor $Q_1$ has a great switching loss as mentioned above. Thus, departure from the region of reverse base bias for safe operation as mentioned above in connection with FIG. 3 is liable to occur, which leads to a poor reliability of operation.

It is usual that the current amplification factor $h_{fe}$ of the transistor $Q_1$ represents a remarkable dispersion. In addition, the current amplification factor $h_{fe}$ constitutes one of the factors from which is determined the conduction time $t_{ON}$ as can be seen from the foregoing equation (2). Hence, it is required that the circuit constants of the base current supply circuit be previously adjusted so that the optimum base current $i_b$ can be supplied to the transistor $Q_1$ depending on the dispersion of the aforementioned current amplification factor $h_{fe}$. Obviously, this is very troublesome.

It is known from the automatic control theory that whether a negative feedback control system is stable or astable depends on the gain of an amplifier included therein and the time delay which occurs therein. In the case of a switching regulator, it is usual that the gain in the negative feedback control system is set up to be high in order to increase the accuracy of the output voltage thereof. In addition a large amount of time delay is inevitably introduced due to the fact that a transformer, filter choke, smoothing capacitor and the like should be employed to constitute a basic circuit. The output of a switching regulator having such a high amplification degree and such a large amount of time delay is liable to diverge so that the tendency for hunting phenomena to occur in the negative feedback control system is increased.

More specifically, in the switching regulator such as shown in FIG. 1 wherein the output of the transistor saturation type blocking oscillator circuit 1 called relaxation oscillator circuit is pulse-width-modulated with a negative feedback signal to thereby achieve stabilization control of the output voltage, the dynamic range D of the pulse-width modulation should be set up so as to be able to cope with all variable elements over the range of $0 < D < 100\%$. The deviation value $e(t)$, i.e., negative feedback signal is $e_0 < e(t) < e_1$, where $e_0$ is the minimum value required for pulse width control, and $e_1$ is the maximum value required for pulse width control. In case, however, hunting phenomena occur in the negative feedback control system so that the latter is caused to oscillate or diverge, then departure from the range of $e_0 < e(t) < e_1$ is caused, thus resulting in overmodulation. For this reason, the pulse width of the relaxation oscillator circuit becomes nil so that the oscillation is ceased. After the lapse of the oscillation cessation time which depends on the conditions under which the aforementioned hunting phenomena occur, the relaxation oscillation circuit is permitted to resume oscillation so as to be brought into a relaxation oscillation state in which a maximum pulse width occurs. Such a condition that the relaxation oscillator circuit is made to irregularly repeat resumption and cessation of oscillation will be referred to as intermittent oscillation condition hereinafter.

Under such an intermittent oscillation condition, the repetition rate of intermittence is very low as compared with the oscillation frequency of the relaxation oscillator circuit. Thus, even if the output rectifying circuit 2 is designed by taking into account the oscillation frequency of the relaxation oscillator circuit, it is not possible to eliminate the repetition rate component of the intermittence by such a circuit 2. Hence, there is produced an output voltage containing a large ripple voltage, which may tend to render the switching regulator unusable. Under the intermittent oscillation condition mentioned above, therefore, the switching regulator loses the output voltage stabilizing function and thus cannot be put to practical use.

Figure 4:
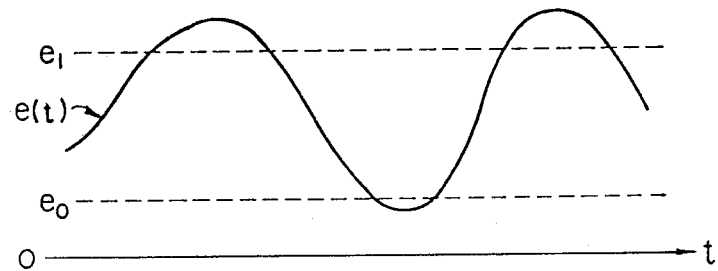
FIG. 4 is a view showing operating voltage waveforms occurring at respective points in the circuit of FIG. 1.
Figure 4:
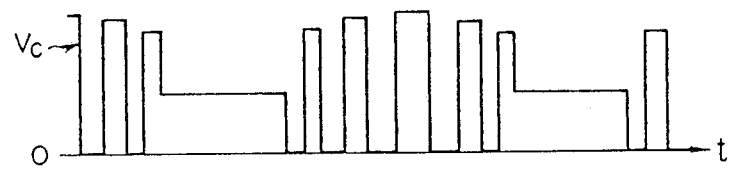
Figure 4:
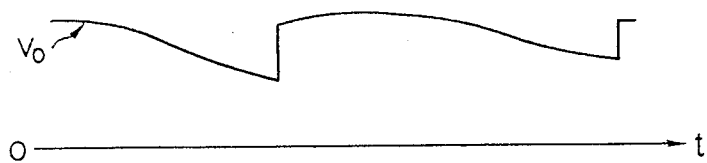

That is, if hunting phenomena occur in the negative feedback control system shown in FIG. 1, then the deviation value e(t) or negative feedback signal derived from the voltage comparator circuit 3 will periodically exceed the value $e_1$ required for the pulse width control as shown in FIG. 4, so that the control transistor $Q_2$ is completely rendered conductive. Thus, the current from the base current supply source which is the sum of a current from a starter resistor $R_2$, a current from a resistor $R_1$ and a current from a capacitor $C_1$ is mostly wasted as collector current of the control transistor $Q_2$. Consequently, a base current for achieving positive feedback enough to permit the relaxation oscillator circuit to effect oscillation will not be available so that the oscillator transistor $Q_1$ will be unable to be rendered conductive. Thus, oscillation will be temporarily ceased as is seen from the waveform $V_c$ shown in FIG. 4. After the lapse of a predetermined period of time, the aforementioned deviation value e(t) or negative feedback signal will periodically become lower than the value $e_0$ required for the pulse width control, so that the control transistor $Q_2$ will be completely rendered non-conductive. As a result, the relaxation oscillator circuit will be brought into an oscillation condition, with no negative feedback applied thereto.

As will be appreciated from the foregoing description, in the conventional switching regulator such as shown in FIG. 1, if hunting phenomena occur in the negative feedback control system, then an intermittent oscillation condition will be brought about as is seen from the waveform $V_c$ shown in FIG. 4. Moreover, there is the tendency that the hunting phenomena grow presumptuous, so that it will become more difficult to escape from the intermittent oscillation condition. Hence, the output voltage $V_0$ will become unstable as will be seen from the waveform $V_0$ shown in FIG. 4; thus, there will be encountered a decided difficulty that the switching regulator loses the output voltage stabilizing function.

Figure 5:
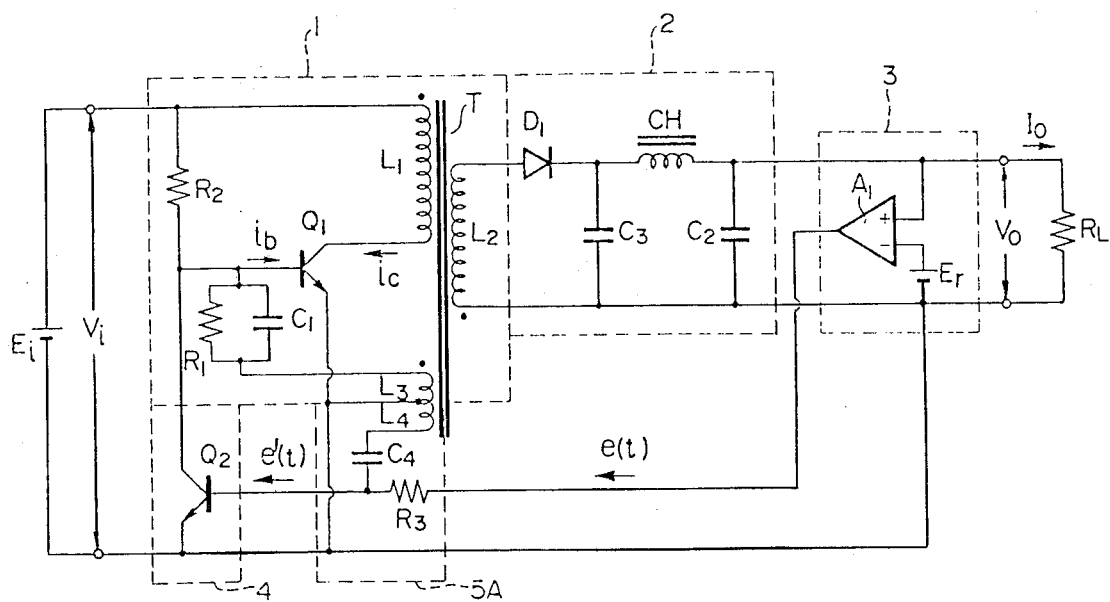
FIG. 5 is a circuit diagram showing the switching regulator according to an embodiment of this invention.

Detailed description will now be made of the basic concept of the present invention with reference to an embodiment thereof which is shown in FIG. 5.

In FIG. 5, there is provided a blocking oscillator circuit 1 which comprises a transformer T, an oscillator transistor $Q_1$, a capacitor $C_1$, a resistor $R_1$ and a starter resistor $R_2$. The transformer T includes a primary winding $L_1$, a secondary winding $L_2$ and a feedback winding $L_3$. Indicated at 2 is an output rectifying circuit which comprises a diode $D_1$, smoothing capacitors $C_2$ and $C_3$ and a choke coil CH. Indicated at 3 is a voltage comparator circuit which comprises a voltage comparator $A_1$ and a reference voltage source $E_r$. Indicated at 4 is a current control circuit comprising a control transistor $Q_2$. Indicated at 5A is an intermittent oscillation preventing circuit which comprises a resistor $R_3$, a capacitor $C_4$ and a third winding $L_4$ of the transformer T.

In the foregoing construction, the intermittent oscillation preventing circuit 5A is arranged to permit the conduction of the oscillator transistor $Q_1$ to be started, while at the same time causing an output derived from the third winding $L_4$ of the transformer T to be differentiated by the capacitor $C_4$ and resistor $R_3$ and causing a signal resulting from the differentiation to be added to cancel a negative feedback signal available from the voltage comparator circuit 3 so that the negative feedback signal in the negative feedback control system can be blanked out for a predetermined period of time.

More specifically, in the embodiment of FIG. 5, even if hunting phenomena occur in the negative feedback control system, the negative feedback signal will be interrupted irrespective of the quantity thereof at the moment that the transistor $Q_1$ is rendered conductive, so that the base current of the oscillator transistor $Q_1$ will not be wasted as collector current of the control transistor $Q_2$. In this way, the oscillator transistor $Q_1$ will be provided at the base thereof with a maximum current from the base current supply source which is the sum of a current supplied from the starter resistor $R_2$, a current supplied from the resistor $R_1$ and a current supplied from the capacitor $C_1$, whereby the oscillator transistor $Q_1$ will be surely rendered conductive, with a result that positive feedback enough to permit the relaxation oscillator circuit to produce oscillation will be applied. Thus, even if there is an excessive negative feedback in the negative feedback control system, the oscillation will never be hindered; thus, the oscillation will be continuously and positively maintained. In addition, a maximum base current can be imparted to the base of the transistor $Q_1$ so that the oscillator saturation voltage of the oscillator transistor $Q_1$ will become lower, thus making it possible to sufficiently reduce the collector loss thereof.

Figure 6:
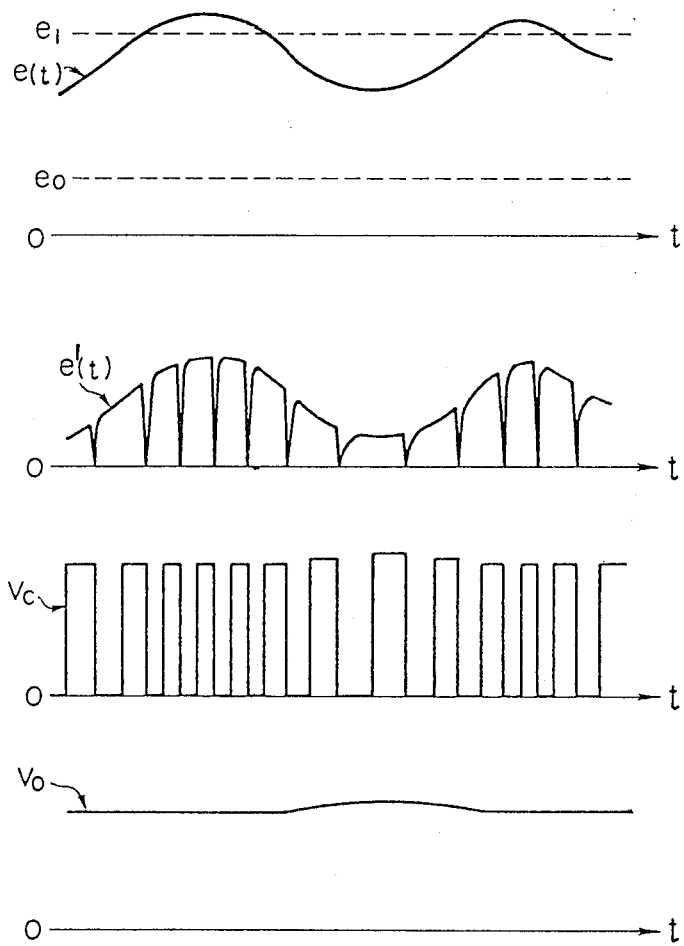
FIG. 6 is a view showing operating voltage waveforms occurring at respective points in the circuit of FIG. 5.

Moreover, in the intermittent oscillation preventing circuit 5A, by extinguishing a signal tending to cancel out the negative feedback signal and permitting the negative feedback signal to be supplied to the transistor $Q_2$ by the time when pulse width control is required, the oscillator transistor $Q_1$ will be saturated at a point of time which corresponds to the quantity of feedback in the negative feedback control system, so that a positive feedback for oscillation will be produced in the relaxation oscillator circuit, whereby the oscillator transistor $Q_1$ will be promptly turned off. In this way, pulse width control will be effected and as a result, there will be obtained a stabilized output voltage $V_0$, as will be seen from a waveform $V_0$ shown in FIG. 6. Furthermore, in the embodiment of FIG. 5, when the oscillator transistor $Q_1$ is turned off, the signal tending to cancel the negative feedback signal will have the polarity thereof reversed so as to be added to the negative feedback signal with the same polarity; thus, the turning off operation of the oscillator transistor $Q_1$ will be further encouraged so that this transistor will be able to be turned off more quickly. Consequently, the switching loss tending to occur when the oscillator transistor $Q_1$ is turned off can be remarkably reduced.

Referring to FIG. 7, there is shown another embodiment of this invention, wherein an intermittent oscillation preventing circuit 5B is provided which comprises a resistor $R_3$, capacitor $C_4$ and transistor $Q_3$.

The intermittent oscillation preventing circuit 5B is arranged so that a variation of the output derived from the transformer T is taken out through the capacitor $C_4$ to thereby drive the transistor $Q_3$. When the oscillator transistor $Q_1$ of the relaxation oscillator circuit is saturated, and in the neighborhood of the point of time when pulse width control is required, the transistor $Q_3$ is turned off so that the deviation value e(t) or negative feedback signal derived from the voltage comparator circuit 3 is applied to the control transistor $Q_2$. At the time when the oscillator transistor $Q_1$ starts conducting, the output of the transformer T will be imparted to the base of the transistor $Q_3$ through the capacitor $C_4$ so as to render this transistor conductive, as a result of which the aforementioned deviation value e(t) or negative feedback signal will be interrupted and hence will never be applied to the control transistor $Q_2$.

Thus, when hunting phenomena occur in the negative feedback system, the deviation value e(t) or negative feedback signal derived from the error detecting circuit 3 will be caused to diverge; therefore, even if the quantity of feedback becomes excessive, the aforementioned negative feedback signal can be interrupted when the oscillator transistor $Q_1$ is just about to be rendered conductive, so that a positive feedback enough to permit oscillation to be produced will be applied to the oscillator transistor $Q_1$, whereby the oscillation can be maintained.

In accordance with the present invention, even if hunting phenomena occur in the negative feedback system, the oscillator circuit will never be brought into the intermittent oscillation state so that the oscillation can be continuously and positively maintained, thereby making it possible not only to prevent the present switching regulator from losing the output voltage stabilizing function but also to reduce the collector loss of the oscillator transistor $Q_1$.

Referring to FIG. 8, there is shown a further embodiment of this invention which includes means to detect a current proportional to the transformer drive current to control the turning on and off of the relaxation oscillation, thereby establishing the condition under which oscillation positively occurs.

According to this embodiment, there is provided a switching regulator comprising a relaxation oscillator circuit for switching on and off a DC voltage supplied from an input power source to thereby drive the transformer, an output rectifying circuit for rectifying the AC output of the transformer, a voltage comparator circuit for comparing the DC output voltage derived from the output rectifying circuit with a reference voltage to provide an output corresponding to the deviation of the DC output voltage from the reference voltage, an error amplifier circuit for amplifying the output of the voltage comparator circuit, a current detecting circuit for detecting the transformer drive current of the relaxation oscillator circuit, and a control circuit for applying to the relaxation oscillator circuit a trigger signal by which the oscillator circuit is switched from the "on" state to the "off" state only when the output of the current detecting circuit exceeds the output of the error amplifier circuit.

The embodiment of FIG. 8 will now be described in detail.

In this embodiment, a blocking oscillator circuit 11 is provided which comprises the primary winding $L_1$ and feedback winding $L_3$ of a transformer T, a transistor $Q_1$, a base resistor $R_1$, a base capacitor $C_1$ and a starter resistor $R_2$. Indicated at 12 is an output rectifying circuit which includes the secondary winding $L_2$ of the transformer T, a diode $D_1$, smoothing capacitors $C_2$ and $C_3$ and a choke CH. Indicated at 13a is a voltage comparator circuit which comprises a voltage comparator $A_1$ and a reference voltage source $E_r$. Indicated at 13b is an error amplifier circuit which comprises a transistor $Q_3$ and a resistor $R_4$. Indicated at 14 is a collector current control circuit which comprises a voltage comparator $A_2$ and a transistor $Q_2$. Indicated at 15 is a current detecting circuit which comprises a resistor $R_5$ or a current detecting element such for example as current transformer.

With the foregoing construction, even if an unstable DC voltage is supplied from the input voltage source $V_i$, a desired stable DC output voltage $V_0$ can be obtained at the output side.

Figure 9:
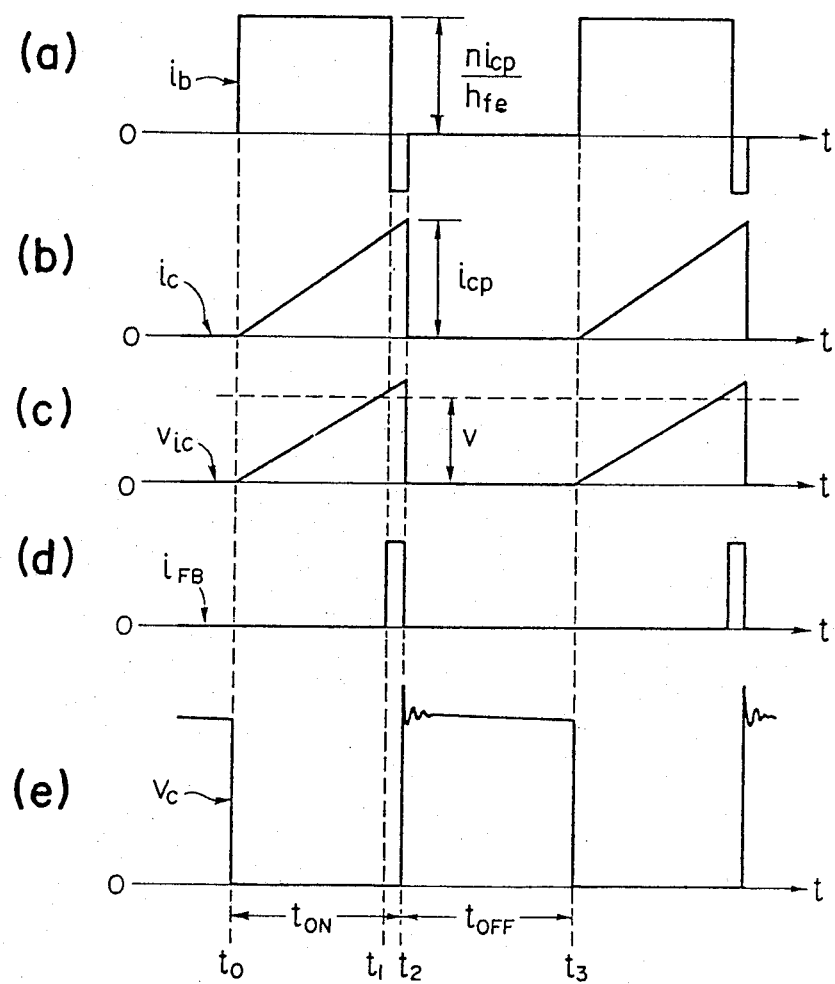
FIG. 9 is a view showing operating current and voltage waveforms occurring at respective points in the circuit of FIG. 8.

The operation of the embodiment shown in FIG. 8 will be explained with reference to FIG. 9 which shows the voltage and current waveforms occurring at respective points in the circuit of FIG. 8.

FIG. 9(a) shows the waveform of base input current $i_b$ of the transistor $Q_1$; FIG. 9(b) shows the waveform of collector current $i_c$ of the transistor $Q_1$; FIG. 9(c) shows the waveform of output voltage $v_{ic}$ of the current detecting circuit 15 and the waveform of output voltage v of the error voltage amplifier circuit 13b; FIG. 9(d) shows the waveform of output current $i_{FB}$ of the collector current control circuit 14; and FIG. 9(e) shows the waveform of collector voltage $V_c$ of the transistor $Q_1$.

Description will first be made of the case where the circuit of FIG. 8 is performing the steady-state operation.

Upon conduction of the transistor $Q_1$ of the blocking oscillator circuit 11, the current $i_c$ will be caused to flow through the primary winding $L_1$ of the transformer T, so that a voltage will be induced across the secondary winding $L_2$ of the transformer T. However, the diode $D_1$ of the output rectifying circuit 12 is of reverse polarity with respect to the thus induced voltage; thus, most of the collector current $i_c$ of the transistor $Q_1$ will be an excitation current $Vi/L_1t$. That is, when the transistor $Q_1$ starts conducting at a point of time $t_0$ in FIG. 9, the collector current $i_c$ thereof will thereupon increase linearly. At this point, in the blocking oscillator circuit 11, if the transistor $Q_1$ is provided at the base thereof with a current which is n times (where n>>1) higher than the minimum value $i_{cp}/h_{fe}$ of the base current required to render the transistor $Q_1$ conductive, then this transistor will be turned on, and thus the collector current $i_c$ will be prevented from saturation by the sufficient base current n $i_{cp}/h_{fe}$ during the conduction of the transistor $Q_1$, so that the collector saturation voltage can be made to be sufficiently low.

The inverted input voltage v of the voltage comparator $A_2$, which is modulated with a signal derived from the error voltage amplifier circuit 13b in correspondence to the deviation value of the output voltage $V_0$ from the reference voltage $V_r$, will be controlled so as to decrease as the output voltage $V_0$ increases. The voltage $v_{ic}$ outputted by the current detecting circuit 15 in proportion to the collector current $i_c = V_i/L_1t$ is applied as non-inverted input voltage $v_{ic}$ of the voltage comparator $A_2$. In the collector current control circuit 14, the non-inverted input voltage $v_{ic}$ of the voltage comparator $A_2$ and the inverted input voltage v thereof will be compared with each other, so that when a relationship that $v_{ic} > v$ holds, the transistor $Q_2$ will be rendered conductive whereas when a relationship that $v_{ic} < v$ holds, the transistor $Q_2$ will be rendered non-conductive.

The fact that the collector current $i_c$ of the transistor $Q_1$ increases linearly as mentioned above, will cause the voltage $v_{ic}$ proportional thereto to be increased linearly. At a point of time $t_1$ in FIG. 9, the relationship between $v_{ic}$ and v becomes such that $v_{ic} > v$, and as a result the transistor $Q_1$ will be rendered conductive so that collector current $i_{FB}$ such as shown in FIG. 9(d) will be caused to flow therethrough. The aforementioned collector current $i_{FB}$ will act in such a direction that all the base current $i_b$ flowing into the transistor $Q_1$ can be thereby cancelled and stored carrier remaining in the transistor $Q_1$ can also be extinguished promptly. Thus, if the output voltage $v_{ic}$ of the current detecting circuit 15 exceeds the output voltage v of the error voltage amplifier circuit 13b, then the transistor $Q_2$ will be turned on, whereas the transistor $Q_1$ will be turned off quickly.

According to this embodiment of the present invention, it is possible to sufficiently reduce the collector saturation voltage to reduce the collector loss by supplying to the transistor $Q_1$ the base current n $i_{cp}/h_{fe}$ which is sufficiently higher than the base current value required for this transistor to be rendered conductive, as will be seen from the waveform of base current $i_b$ shown in FIG. (a). Furthermore, at a point of time when the collector current $i_c$ of the transistor $Q_1$ reaches a peak value suitable for stabilization of the output voltage, or at a point of time $t_2$ shown in FIG. 9, such a collector current peak value $i_{cp}$ is detected by the current detecting circuit 15, and the collector current control circuit 14 is operated by a signal resulting from the detection so that the transistor $Q_1$ is forcibly turned off, whereby the collector loss which tends to occur when the transistor $Q_1$ is turned off is further reduced, thus making it possible to enhance the power conversion efficiency of the switching regulator. In addition, the carrier storage time of the transistor $Q_1$ when the latter is turned off can be remarkably shortened so that the maximum oscillation frequency can also be increased, whereby the pulse width modulation range of the switching regulator can be widened. In this way, according to this embodiment, the load range can be widened toward the light load side, and yet any abnormal increase in the output voltage $V_0$ due to the frequency limitation imposed under a light load condition can be prevented, as a result of which the stability of the output voltage $V_0$ can be increased. The conduction time $t_{ON}$ of the transistor $Q_1$ when the present switching regulator is in oscillating state is given as follows:

$$t_{ON} = \frac{L_1}{R_5 V_i} \cdot v \qquad (3)$$

where $L_1$ is the inductance of the primary winding of the transformer, $R_5$ is a current detecting resistor, $V_i$ is an input voltage, and v is the output of the error amplifier circuit. As will be readily appreciated, the conduction time $t_{ON}$ of the transistor $Q_1$ is not related in any way to the current amplification factor $h_{fe}$ or the like of the transistor $Q_1$ which is subject to large dispersion, so that the designing of the base current supply circuit and negative feedback circuit can be easily achieved. Furthermore, the conduction time $t_{ON}$ is a function of the output v of the error amplifier circuit 13b, oscillation which is pulse-width-modulated with respect to load variations, input variations and so forth is produced in the novel blocking oscillator circuit so that the excitation energy stored in the transformer T is controlled, thus resulting in the output voltage $V_0$ being stabilized.

Further advantages of this invention will be described below.

In the self-oscillation type switching regulator shown in FIG. 8, it is only at the moment when the oscillator transistor $Q_1$ is turned off that the negative feedback signal from the collector current control circuit 14 is applied to the blocking oscillator circuit 11. At any other moments including the moment when the oscillator transistor $Q_1$ is turned off, no negative feedback signal is applied to the blocking oscillator circuit 11, so that the base current $i_b$ is sufficiently imparted so that positive feedback enough to achieve blocking oscillation is provided. Thus, according to this invention, it is possible to secure the on and off states of the relaxation oscillation under a positive oscillation condition, and in addition, it is also possible to prevent occurrence of intermittent oscillation phenomena tending to be caused by overmodulation in pulse-width modulation due to hunting phenomena in the negative feedback control system which has heretofore constituted a very difficult problem with the design of the conventional self-oscillation type switching regulator. In this way, the reliability of operation of the circuit can be enhanced.

The embodiment of FIG. 8 was constructed in such a manner that the current detecting circuit 15 comprising resistor $R_5$ is connected with the emitter of the oscillator transistor $Q_1$ so that the collector current $i_c$ of the oscillator transistor $Q_1$ or so-called transformer drive current is directly detected at the primary side of the transformer T. It goes without saying that this invention is by no means limited thereto, but effects similar to those mentioned above can also be produced by detecting a current proportional to the aforementioned transformer drive current by use of current detecting means such as resistor or current transformer at the primary side or secondary side of the transformer T.

Moreover, the switching regulator according to this invention can also perform an overcurrent protecting function without having any special overcurrent protecting circuit components incorporated therein, as will be appreciated from the below description.

As mentioned above, according to this invention, based on the foregoing equation (3), the conduction time $t_{ON}$ of the blocking oscillator circuit 11 is controlled by the output v of the error amplifier circuit which is obtained in accordance with the deviation value of the output voltage $V_0$ from the reference voltage $V_r$, for the purpose of stabilizing the output voltage $V_0$ with respect to the output current $I_0$. However, since the power source for the error amplifier circuit 13b is obtained from the output voltage $V_0$, the operational range of the error amplifier circuit output v is limited by the output voltage $V_0$. More specifically, since the relationship between the error amplifier circuit output v and the output voltage $V_0$ is such that $V \leq V_0$, the increase in the conduction time $t_{ON}$ is limited when the conduction time $t_{ON}$ which increases as the output current $I_0$ increases is given by the following equation:

$$t_{ON} = \frac{L_1}{R_5 \cdot V_i} \cdot V_o \quad (4)$$

Furthermore, in the switching regulator according this invention, after the relationship of the equation (4) has been established, the relationship between the output voltage $V_0$ and the output current $I_0$ when the load resistor $R_L$ constitutes such an overload as to increase the output current $I_0$ is given by the following equation (5):

$$V_o + V_i\sqrt{\frac{L_2}{L_1}} = \frac{V_i^2}{2R_5}\sqrt{\frac{L_2}{L_1}} \cdot \frac{1}{\frac{V_i}{2R_5} - I_o} \quad (5)$$

The equation described just above is a herperbolic function whose asymptotes are $$V_o = -V_i\sqrt{\frac{L_2}{L_1}}$$

(output voltage) and $I_0 = V_i/2R_5$ (output current) respectively. It is when the relationship between the output v of the error amplifier circuit 13b and the output voltage $V_0$ is such that $v = V_0$ that the equation (5) holds true. When $v < V$, or when the output current $I_0$ is not overcurrent, the output voltage $V_0$ is controlled by the reference voltage of the reference voltage source $E_r$ so as to be stabilized, as will be seen from the equation (1). When the output voltage and output current are such that $V_0 \geq 0$ and $I_0 \geq 0$ respectively, the relationship between the output voltage $V_0$ and the output current $I_0$ is given by a combination of the equations (1) and (2); thus, an overcurrent protecting function such as shown in FIG. 12 can be realized.

Figure 12:
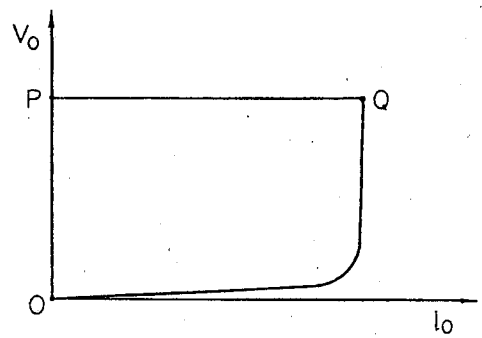
FIG. 12 is a view showing the relations between voltage $V_0$ and output current $I_0$ of the circuits shown in FIGS. 8 and 10 respectively.

In FIG. 12, when the output current $I_0$ is within the rated value range and the output v of the error amplifier circuit 13b is within the operation range proportional to the deviation of the DC output voltage derived from the output rectifying circuit 12 to the reference voltage of the reference voltage source $E_r$ incorporated in the voltage comparator 13a, the relationship between $V_0$ and $I_0$ depicts a line P–Q in FIG. 12; thus, the output voltage $V_0$ is stabilized based on the aforementioned equation (1). When the load resistor $R_L$ is such that the output current $I_0$ exceeds the rated range and the operational range is limited by the voltage applied to the error amplifier circuit 13b or the DC output voltage $V_0$ obtained at the output end, the relationship between $V_0$ and $I_0$ depicts a curve Q—O in FIG. 12, so that the output current $I_0$ is limited based on the aforementioned equation (5). In this way, the switching regulator according to this invention is enabled to perform such an overcurrent protecting function as represented by the curve P—Q—O shown in FIG. 12.

Furthermore, the operating point for overcurrent detection in this invention is set up by the output v of the error voltage amplifier circuit 13b, and the output v is caused to rise up from zero at the time when the operation is initiated, thus, the operation is initiated while the output current $I_0$ and transformer drive current are being restrained. In this way, according to this invention, it is possible to achieve not only the overcurrent protecting function as mentioned above but also the "soft start" function, whereby the present switching regulator can be effectively protected from breakage of the transformer driving transistor or the like which tends to be caused at the start of operation.

Referring to FIG. 10, there is shown a still further embodiment of this invention wherein use is made of means for detecting a current proportional to the transformer drive current from the secondary side of the transformer T, which will be described below.

For the convenience of illustration, in FIG. 10, parts similar to those of FIG. 8 are indicated by like references. Indicated at 12 is an output rectifying circuit which comprises a diode $D_1$, a free-wheeling diode $D_2$, a choke coil CH and a smoothing capacitor $C_2$. Indicated at 13b is an error amplifier circuit which comprises a resistor $R_4$ and a transistor $Q_3$. Indicated at 13a is a voltage comparator circuit which comprises a reference voltage source $E_r$ and a voltage comparator $A_1$. Indicated at 14 is a current control circuit for applying to the blocking oscillator circuit 11 a trigger signal to turn it off, which comprises a voltage comparator $A_2$ and a transistor $Q_2$. Indicated at 15 is a current detecting circuit which comprises a current detecting element such as current transformer CT, resistor or the like.

Figure 11:
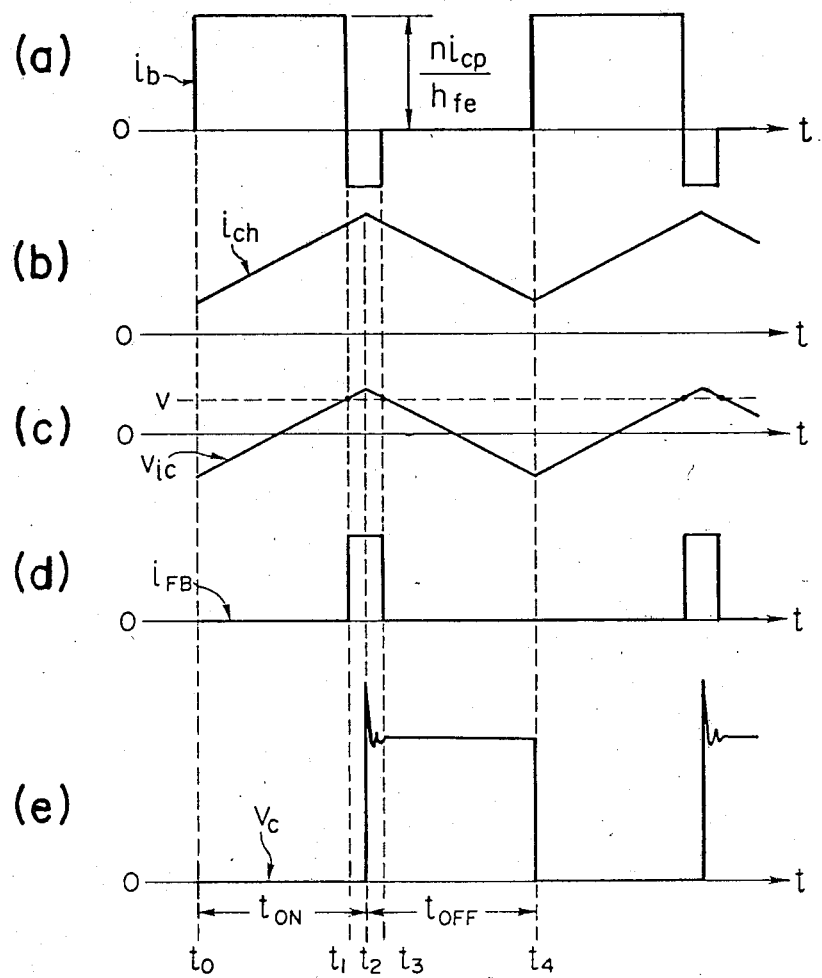
FIG. 11 is a view showing operating current and voltage waveforms occurring at respective points in the circuit of FIG. 10.

With the switching regulator constructed as mentioned above, by modulating the pulse width of the current for driving the transformer, it is possible to obtain a desired stable DC output voltage $V_0$ even if an unstable DC voltage $V_1$ is supplied from input power source $E_i$. FIG. 11 shows the voltage and current waveforms occurring at respective points in the circuit shown in FIG. 10. The operation of the circuit shown in FIG. 10 will be described below.

FIG. 11(a) shows the waveform of base input current $i_b$ of the transistor $Q_1$; FIG. 11(b) shows the waveform of current $i_{CH}$ flowing through the choke coil CH; FIG. 11(c) shows the waveform of output voltage $v_{ic}$ of the current detecting circuit 15 and the waveform of output voltage v of the error voltage amplifier circuit 13b; FIG. 11(d) shows the waveform of output circuit $i_{FB}$ of the current control circuit 14; and FIG. 11(e) shows the waveform of collector-emitter voltage of the transistor $Q_1$.

Description will first be made of the case where the circuit of FIG. 10 is performing steady-state operation.

When the transistor $Q_1$ of the blocking oscillator circuit 11 is rendered conductive, current $i_c$ will thereupon be caused to flow through the primary winding $L_1$ of the transformer T, so that a voltage will be induced across the secondary winding $L_2$ of the transformer T. However, the diode $D_1$ of the output rectifying circuit 12 is of reverse polarity with respect to the thus induced voltage; thus, current $i_{CH}$, which results from superimposition of load current and excitation current upon each other, will be caused to flow through the choke coil, as will be seen from the current waveform shown in FIG. 11(b). The current $i_{CH}$ which is caused to flow through the choke coil CH upon conduction of the transistor $Q_1$ at a point of time $t_0$ in FIG. 11, will increase linearly. In the blocking oscillator circuit, by applying to the transistor $Q_1$ a current n time (where n >> 1) higher than the minimum base current $i_{cp}/h_{fe}$ required to permit the transistor $Q_1$ to be rendered conductive, this transistor $Q_1$ will be turned on, and the collector current $i_c$ will be prevented from saturation by the sufficient base current $n \cdot i_{cp}/h_{fe}$ during the conduction of the transistor $Q_1$, whereby the collector saturation voltage will be able to be sufficiently reduced.

The reversed input terminal voltage v of the voltage comparator A, which is modulated with a signal derived from the error voltage amplifier circuit 13b in accordance with the deviation of the output voltage $v_0$ from the reference voltage $V_r$ is controlled in such a manner as to decrease as the output voltage $V_0$ builds up. The voltage $v_{ic}$ proportional to a variation in the current $i_{CH}$ flowing through the choke coil CH which is outputted by the current detecting circuit 15, is applied as non-reversed input terminal voltage $v_{ic}$ of the voltage comparator $A_2$. The current control circuit 14 is arranged so that the non-reversed input terminal voltage $v_{ic}$ and reversed input terminal voltage v of the voltage comparator $A_2$ are compared with each other and thus an output signal is derived from the voltage comparator $A_2$ only when the relationship between $v_{ic}$ and v is such that $v_{ic} > v$, whereby the transistor $Q_2$ is driven by the output signal. Since the current $i_{CH}$ flowing trhough the choke coil CH increases linearly as mentioned above, the voltage $v_{ic}$ proportional to a variation in the current $i_{CH}$ will also increase linearly. At a point of time $t_1$ shown in FIG. 11, the relationship between $v_{ic}$ and v will become such that $v_{ic} > v$ so that an output is derived from the voltage comparator $A_2$ and then applied to the base of the transistor $Q_2$. Thus, the transistor $Q_2$ will be rendered conductive at the point of time $t_1$, so that such a collector current $i_{FB}$ as shown in FIG. 11(d) will be caused to flow therethrough. This collector current $i_{FB}$ will act in such a direction as to cancel all the base current $i_b$ flowing into the transistor $Q_1$, which will remain conductive until a point of time $t_2$ when the carrier accumulated therein disappears. Thus, as can be seen from FIG. 11(b), the current $i_{CH}$ flowing through the choke coil CH will increase from the volue at the point of time $t_0$ to the value at the point of time $t_2$, and as a result, excitation energy will be accumulated in the choke coil CH. At the point of time $t_2$, the transistor $Q_1$ will be rendered conductive. The excitation energy accumulated in the choke coil during the period from $t_0$ to $t_2$ will be discharged therefrom during a period from $t_2$ to $t_4$, so that the current $i_{CH}$ will be decreased. Thus, the aforementioned voltage $v_{ic}$ will also be decreased, and the collector current $i_{FB}$ of the transistor $Q_2$ will continue to flow until the relationship between $v_{ic}$ and v becomes such that $v_{ic} < v$, that is during the period from $t_1$ to $t_3$. In this way, during the period from $t_1$ to $t_2$, it is possible not only to extinguish the base current $i_b$ of the transistor $Q_1$ but also to sufficiently and quickly extinguish the accumulated carrier remaining in the transistor $Q_1$. When the output voltage $v_{ic}$ of the current detecting circuit 15 exceeds the output voltage v of the error voltage amplifier circuit 13b, the transistor will be rendered conductive so that the transistor $Q_2$ will be rendered conductive whereas the transistor $Q_1$ will be rendered non-conductive quickly.

According to this invention, by applying to the transistor $Q_1$ a base current $n \cdot i_{cp}/h_{fe}$ which is sufficiently higher than the base current value required to permit the transistor $Q_1$ to be rendered conductive as can be seen from the waveform of base current $i_b$ shown in FIG. 11(a), the collector saturation voltage can be restrained so that the collector loss can be reduced. In order that the transistor $Q_1$ may be turned off at the point of time $t_2$ shown in FIG. 11 when the current $i_{CH}$ flowing through the choke coil CH reaches a peak value appropriate for stabilization of the output voltage $V_0$, such a peak value of the current $i_{CH}$ is detected by the current detecting circuit 15, and the current control circuit 14 is operated by the detection output. In this way, even after the transistor $Q_1$ has been forcibly turned off, the current $i_{CH}$ flowing through the choke coil CH will not be extinguished momentarily, but will be decreased linearly after the point of time $t_2$. By forcibly operating the current control circuit 14 even during the period from $t_2$ to $t_3$ in which the relationship between $v_{ic}$ and v becomes such that $v_{ic} < v$, and by maintaining a deep reverse bias at the base of the transistor $Q_1$ which drives the primary winding $L_1$ of the transformer T, it is possible to further reduce the collector loss tending to occur when the transistor $Q_1$ is turned off, thereby increasing the power conversion efficiency of the switching regulator. Furthermore, during the period from $t_1$ to $t_3$, or during the period from a point of time immediately before the transistor $Q_1$ is turned off to the point of time when this transistor is actually turned off, the base of the transistor $Q_1$ is forcibly reversely biased; thus, the transistor $Q_1$ can also be reliably operated against a spike-like overvoltage such as shown in FIG. 11(e) which tends to occur in the primary winding $L_1$ of the transformer T when the transistor $Q_1$ is turned off, in the reverse bias safe operation region such as shown in FIG. 3 in which the collector-emitter withstand voltage is higher than in the forward bias safe operation region such as shown in FIG. 3(b). According to this invention, therefore, it is possible to utilize the absolute maximum rated value $V_{CEV}$ of the withstand voltage between the reversely biased collector and emitter which higher than the usual absolute maximum rated value $V_{CEO}$ of the withstand voltage between the collector and the emitter of the transistor, as a result of which the reliability of operation of the circuit can be enhanced.

Moreover, the time for carrier accumulation when the transistor $Q_1$ is turned off can be remarkably shortened so that the maximum oscillation frequency can be increased, thereby making it possible to widen the pulse width modulation range of the switching regulator. Thus, according to this invention, the load range can be widened toward the heavy load side, and in addition, the output voltage $V_0$ can be prevented from being abnormally increased due to the frequency limitation imposed under a light load condition, so that the stability of the output voltage can be increased. Effects similar to those of the embodiment shown in FIG. 8 can also be produced. According to this embodiment, the on and off states of relaxation oscillation can be secured under a positive oscillation condition, and yet intermittent oscillation phenomena can be prevented; thus, the reliability of operation of the circuit can be enhanced. In addition, this embodiment performs an overcurrent protecting function similar to that which has been described above.

Figure 13:
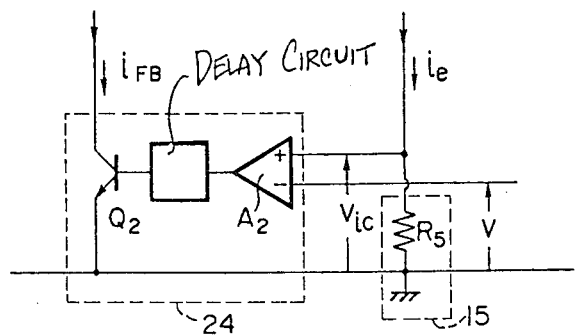
FIG. 13 is a partial circuit diagram showing a modification to the circuit of FIG. 8.

By constructing the current control circuit 14 of FIG. 10 as shown in FIG. 13, it is possible to further enhance the reliability of operation. In FIG. 13, the current control circuit 14 according to the embodiment of FIG. 10 is shown as including a delay circuit DL connected between the base of the transistor $Q_2$ and the output terminal of the voltage comparator $A_2$. Thus, in the current control circuit 14, the non-reversed input terminal voltage $v_{ic}$ and reversed input terminal voltage v of the voltage comparator $A_2$ will be compared with each other, and only when the relationship between $v_{ic}$ and v is such that $v_{ic} > v$, an output signal is derived from the voltage comparator $A_2$. The output signal thus derived will be passed through the dalay circuit DL to be delayed by a time td, and then will be applied to drive the transistor $Q_1$.

Figure 14:
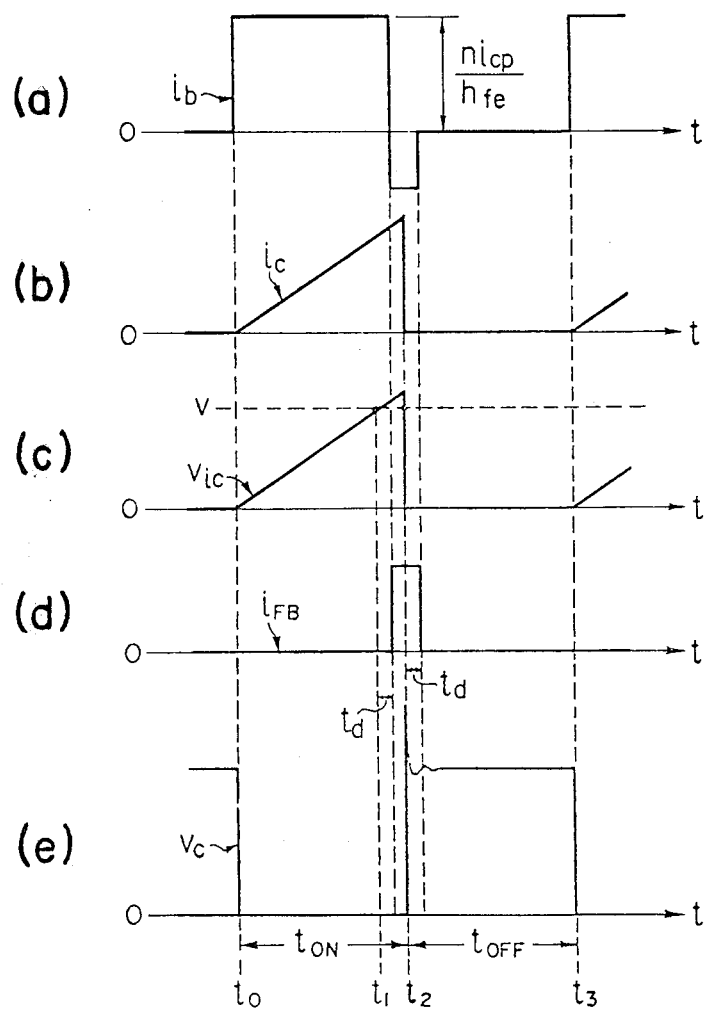
FIG. 14 is a view showing operating current and voltage waveforms occurring in the circuit of FIG. 13.

Since the collector current $i_c$ of the transistor $Q_1$ increases linearly as mentioned above, the voltage $v_{ic}$ proportional thereto will also increase linearly. At a point of time $t_1$ in FIG. 14, the relationship between $v_{ic}$ and v becomes such that $v_{ic} > v$ so that an output is provided by the voltage comparator $A_2$. The output thus provided will be passed through the delay circuit DL and then applied to the base of the transistor $Q_2$. Thus, the transistor $Q_2$ will be rendered conductive with a time delay of td behind the point of time $t_1$, and as a result, such a collector current $i_{FB}$ as shown in FIG. 14(d) will be caused to flow therethrough. This collector current $i_{FB}$ will act in such a direction as to cancel all the base current $i_b$ flowing into the transistor $Q_1$. As the collector current $i_c$ decreases, the aforementioned voltage $v_{ic}$ will also decrease. Even if the relationship between $v_{ic}$ and v becomes such that $v_{ic} < v$, however, the collector current $i_{FB}$ of the transistor $Q_2$ will continue to flow during the time td. Therefore, by suitably adjusting the time td, it is possible to permit the accumulated carrier remaining in the transistor $Q_1$ to be extinguished quickly. In this way, when the output voltage $v_{ic}$ of the current detecting circuit 15 exceeds the output voltage v of the error amplifier circuit 13b, the transistor $Q_2$ will be rendered conductive with the time delay of td, whereas the transistor $Q_1$ will be promptly rendered non-conductive.

By imparting to the transistor $Q_1$ a base current $n \cdot i_{cp}/h_{fe}$ (where $n \gg 1$) which is sufficiently high as compared with the value of base current which is required when this transistor is to be turned on, as will be seen from the waveform of base current $i_b$ shown in FIG. 14(a), it is possible to suppress the collector saturation voltage thereof, thus reducing the collector loss thereof. At a point of time $t_2$ shown in FIG. 14 when the collector current $i_c$ of the transistor $Q_1$ reaches a peak value suitable to stabilize the output voltage, the collector current peak value $i_{cp}$ will be detected by the current detecting circuit 15, and the detection output, after being delayed, will be applied to operate the current control circuit 14. Thus, even after the transistor $Q_1$ has been forcibly turned off, the current control circuit 14 will be forcibly operated for the period of time td so as to keep a deep reverse bias at the base of the transistor $Q_1$ which drives the primary winding $L_1$ of the transistor T, whereby the collector loss of the transistor $Q_1$ which tends to occur when this transistor is turned off will be further reduced, thus resulting in the power conversion efficiency of the switching regulator being enhanced. Furthermore, since the transistor $Q_1$ will have the base thereof forcibly maintained at the reverse bias for the period of time td after the transistor $Q_1$ has been turned off, this transistor $Q_1$ can also be reliably operated against a spike-like overvoltage which tends to occur in the primary winding $L_1$ of the transformer T after the transistor $Q_1$ has been rendered non-conductive, in the reverse bias safe operation region in which the collector-emitter withstand voltage of the transistor is higher than in the forward bias safe operation region such as shown in FIG. 3(b). Thus, according to this invention, it is possible to utilize the absolute maximum rated value $V_{CEV}$ of the withstand voltage between the reversely biased collector and emitter which is higher than the usual absolute maximum rated value $V_{CEO}$ of the withstand voltage between the collector and the emitter of the transistor; as a result, the reliability of operation of the circuit can be further enhanced.

In this way, according to the present invention, the load range can be widened toward the light load side, and in addition, the output voltage $V_0$ can be prevented from being abnormally increased due to the frequency limitation imposed under a light load condition, so that the stability of the output voltage can be enhanced. Furthermore, by virtue of the fact that the conduction time $t_{ON}$ of the transistor $Q_1$ under an oscillating condition has no relationship with the DC current amplification factor $h_{fe}$ of the transistor $Q_1$ which has a large dispersion, the designing of the base current supply circuit and negative feedback circuit which comprise the feedback winding $L_3$, base resistor $R_1$ and base capacitor $C_1$ can be facilitated.

Though, in the foregoing, description has been made of the cases where the present invention was applied to ON-OFF and ON-ON transformer system self-oscillation type switching regulators, it will be understood that many changes and modifications will become possible on the basis of the technical idea of the present invention. It is to be understood that the self-oscillation type switching regulators according to this invention include not only ones of the type wherein a self-oscillator circuit is constituted by a power conversion transformer and switching transistor, but also ones of the type wherein a switching transistor is turned on by an external trigger signal, and part of the output of a power conversion transformer which is driven by the transistor is fed back to the base of the transistor, so that self-oscillation is produced for a half cyclic period.

As will be appreciated from the foregoing explanation, according to the present invention, there are provided switching regulators with high power conversion efficiency as well as high operational reliability and which are not adversely influenced by dispersion in transistor characteristics.

What is claimed is:

1. A switching regulator comprising a blocking oscillator circuit for converting into an intermittent form a DC voltage supplied from an input power source to thereby drive a transformer; a rectifier circuit for rectifying an AC voltage output derived from said transformer; a voltage comparator circuit for comparing the DC output voltage derived from said rectifier circuit with a reference voltage to provide an output corresponding to the deviation of said DC output voltage from said reference voltage; an error voltage amplifier circuit for amplifying the output of said voltage comparator; a current detecting circuit for detecting a transformer driving current of said blocking oscillator circuit; and a control circuit means for comparing the output of said current detecting circuit with the output of said error voltage amplifier circuit and applying to said oscillator circuit a trigger signal for causing said oscillator circuit to be changed from the on state to the off state only when the output of said current detecting circuit exceeds the output of said error voltage amplifier circuit.

2. A switching regulator according to claim 1, wherein said current detecting circuit is connected in series with the primary winding of said transformer.

3. A switching regulator according to claim 1, wherein said current detecting circuit is arranged to detect a current proportional to a current flowing through a choke transformer provided in a smoothing circuit including a free-wheeling diode.

4. A switching regulator according to claim 1, wherein the operational range of said error voltage amplifier circuit is limited by a voltage proportional to the DC output voltage derived from said rectifier circuit.

* * * * *